H. C. BERRY.
APPARATUS AND METHOD FOR THE DELIVERY, SEPARATELY
AND SIMULTANEOUSLY, UPON THE SAME POINT, OF TWO OR
MORE LIQUIDS CHEMICALLY INCOMPATIBLE.
No. 183,110. Patented Oct. 10, 1876.
FIG 1.
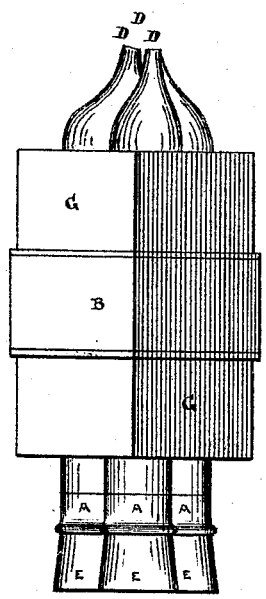
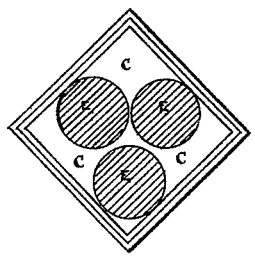
FIG 3.
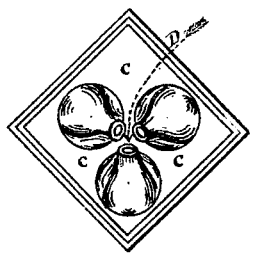
FIG 2. FIG 4.
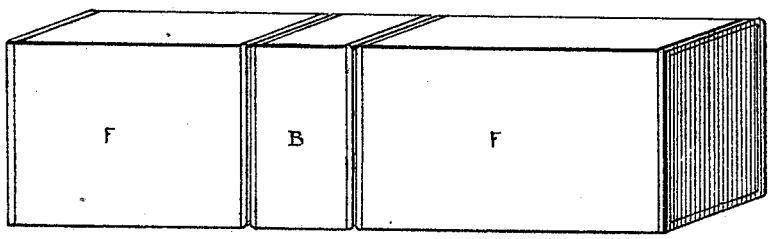
FIG 5.
WITNESSES.
Wm T. Butler
Ed. Van Haren.
INVENTOR.
Henry C. Berry.
JAMES R. OSGOOD & CO. BOSTON.

UNITED STATES PATENT OFFICE.

HENRY C. BERRY, OF CHICAGO, ILLINOIS.

IMPROVEMENT IN APPARATUS AND METHODS FOR THE DELIVERY, SEPARATELY AND SIMULTANEOUSLY, UPON THE SAME POINT, OF TWO OR MORE LIQUIDS CHEMICALLY INCOMPATIBLE.

Specification forming part of Letters Patent No. 183,110, dated October 10, 1876; application filed June 30, 1876.

*To all whom it may concern:*

Be it known that I, HENRY C. BERRY, of the city of Chicago, in the county of Cook and State of Illinois, have invented a new and useful apparatus for the delivery, separately and simultaneously upon the same point, of two or more liquids, some or all of which are chemically incompatible in their nature; and I do hereby declare the following to be a full, clear, and exact description thereof, which will enable others skilled in the art to which it appertains to make and use the same, reference being had to the accompanying drawings, and to the letters of reference marked thereon, which form a part of this specification.

Hitherto much difficulty has been experienced by operators in various arts on account of the chemical incompatibility of certain liquids—in other words, the tendency of these liquids to undergo chemical change when mixed together. For example, equal proportions of nitrate of silver and nitrate of potash, known to the profession as "mitigated nitrate of silver," and extensively employed for the treatment of granulated eyelids and other ulcerous diseases, undergo chemical change when held in solution together for a short period, such change resulting in a precipitate, and rendering the solution utterly useless for the purpose named. The ingredients becoming inert in specific individual properties, the mixture, when applied, is deficient in results. To secure the required degree of activity and certainty, and produce the desired effect, necessitates, therefore, a frequent renewal of the mixture and immediate application, causing considerable expense and loss of time, as well as inconvenience. The above example is only one of a great many that might be cited.

My invention has for its object the overcoming of this difficulty; and it consists, first, in the application, simultaneously and at the same time separately, to a given point or portion of any animal substance, or of any material, fabric, or tissue, of two or more liquids, some or all of which are chemically incompatible. It consists, also, in apparatus for the above purpose, comprising two or more tubes of glass, metal, or other suitable material, formed alike, each with a capillary spout at one end and having its other end supplied with a stopper, the several tubes being held together by appropriate means, with their spouts in as close juxtaposition as shall be deemed desirable, and all directed toward a common point; and it consists, finally, in combining, with the above-mentioned apparatus, a suitable casing to protect it from injury, all as hereinafter more fully set forth.

The form of device which I prefer to employ for the carrying out of my invention is clearly illustrated in the accompanying drawings, of which—

Figure 1 is a view of a single tube without the cork. Fig. 2 is a perspective view of my apparatus, embracing three tubes and incased in a box, the end covers of which are removed. Fig. 3 is an end view of the same, showing the corks. Fig. 4 is an end view, showing the relative positions of the spouts, and Fig. 5 is the box for inclosing the apparatus.

The tubes A, having the capillary spouts D (slightly bent, if necessary) at one end, and provided with corks or stoppers E at the other, are placed side by side within a box, B, of card-board or other suitable material, and with their spouts directed toward a common point, as shown in Fig. 4. The drawing shows three tubes; but I do not limit myself to this or any other number. The interstices between the respective surfaces of the tubes, and also between their surfaces and the interior surface of the box, are then filled with plaster-of-paris, or other cement, C, whereby they are held firmly in place; or they may be fastened in any other convenient manner.

In order that the corks may not be attacked and injured by the chemical action of the liquids, it is often advisable to coat the ends to be inserted with some resisting substance. I find paraffine to be the most generally effective.

The box B for incasing the apparatus is constructed with removable end covers F, which should be made to fit the parts G closely. The one fitting over the spouts may be filled in with cotton or other suitable material, so that when it is fixed in place the spouts will be closed, or they may be closed by any other convenient and effective means.

The operation is as follows: Fill or partly fill the respective tubes with the required liquids, keeping the spouts closed meanwhile by the means provided for that purpose. Next, cork them securely, when the apparatus will be ready for use. The end of the box covering the corks, and the corks themselves, need never be removed except for the purpose of replenishing. To apply the apparatus, simply remove the cover from over the ends of the spouts, invert the tubes above the place to be treated, and lightly tap the opposite end of the box, whereupon the liquids will drip out. The quantity of the discharge may be increased by impelling with a slight dash, after the manner of using a cruet; or else (and especially where the fluids are applied to fabrics) the ends of the spouts may be brought into direct contact with the material, when the capillary attraction of the latter will serve to render the flow continuous.

It will be seen from the foregoing description that by means of my apparatus the several ingredients of a desired mixture may be kept separate from each other up to the instant when such mixture is needed for application, thus suffering no precipitation nor other deterioration on account of mutual influence. Owing to this permanency their effects may be reasonably foretold without the expense and delay incident upon frequent renewals. It will also be seen that the combination and arrangement of the tubes enable the operator, as a result thereof, to secure the immediate and simultaneous delivery, upon any substance, of incompatible liquids, as above mentioned, either by drop, dash, or capillary attraction.

The uses to which my apparatus may be applied in the various arts are too numerous and too varied to admit of anything like specific mention; but in addition to the one already referred to—viz., in the treatment of wounds, sores, ulcers, and the like—the following may be named, and these will tend to suggest many others: In staining cells for microscopic examination the old method is to stain the object with nitrate of silver, and subsequently wash with *liquor potassae;* whereas, by using my apparatus the whole work may be done at one and the same time with speedy and desired results, thus effecting a saving both of time and expense by obviating detailed preparation and double labor. Again, it may be used to great advantage in the bleaching (with chlorine gas, for example) of vegetable structures for the microscope. A solution of a substance containing chlorine with another substance which will cause the chlorine to be liberated or evolved, gives off chlorine gas for a time, but shortly becomes totally inert. Thus a saturated solution of chloride of lime, to which is added a small quantity of nitrate, acetic, or other acid, upon being placed upon a leaf immediately removes the chlorophyl, the acid causing the evolution of chlorine gas from the aqueous solution; but this aqueous solution is only good for a very brief period, and hence requires frequent preparation afresh, to the loss of valuable time, and the imposing of considerable labor upon the microscopist. With my apparatus the acid and the chlorine solution may be held in separate tubes, and brought together only after leaving the points of the spouts thereof, and distributed simultaneously upon the structure, the evolution taking place then and there, thus effecting the desired bleaching promptly and without waste. Once prepared, moreover, it is permanent and always ready for use.

It is obvious that where it is requisite that one fluid should be supplied in greater quantity than another, the spouts, and the tubes also, if desired, may be made of different sizes, or else two or more tubes may be filled with the same fluid. In this manner specifics liable to spoil on account of incompatibility on the part of their ingredients may be advantageously put up, the previous arrangement being such that the said ingredients shall fall together in the requisite proportions when turned into a spoon or glass, or upon the part to be treated.

What I claim as new, and desire to secure by Letters Patent, is—

1. The method of delivering two or more liquids, chemically incompatible, simultaneously at the same point, and preventing their premature commixture, which consists in conveying them to the point of application in separate conduits, and discharging them there, substantially as described.

2. The tubes A, having spouts D in juxtaposition, substantially as described, and for the purpose set forth.

3. The combination of the tubes A, having spouts D and stoppers E, and the box B, substantially as described, and for the purpose set forth.

HENRY C. BERRY.

Witnesses:
  WM. T. BUTLER,
  ED. VAN HAVEN.